Sept. 8, 1953 — J. A. STAFFORD — 2,651,769
SEISMIC VIBRATION DETECTOR
Filed Aug. 1, 1952 — 2 Sheets-Sheet 1

John A. Stafford
INVENTOR.

BY
ATTORNEY

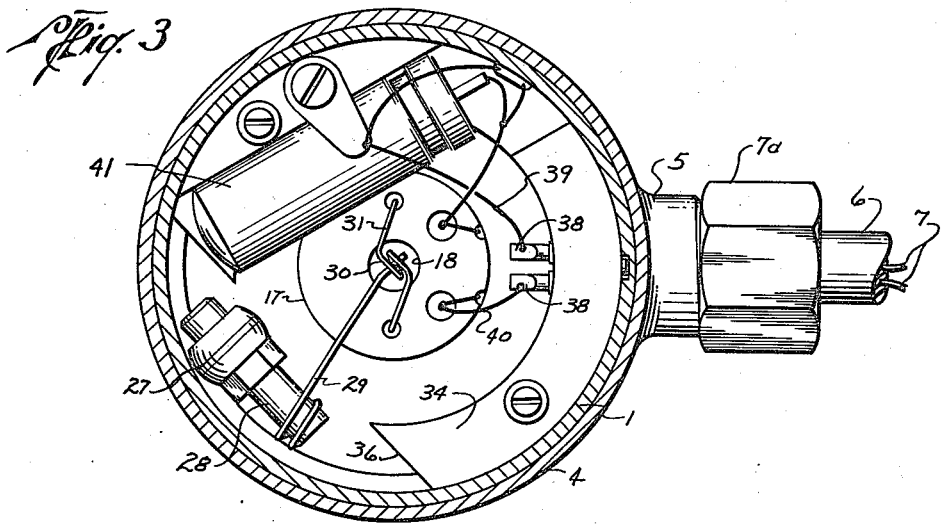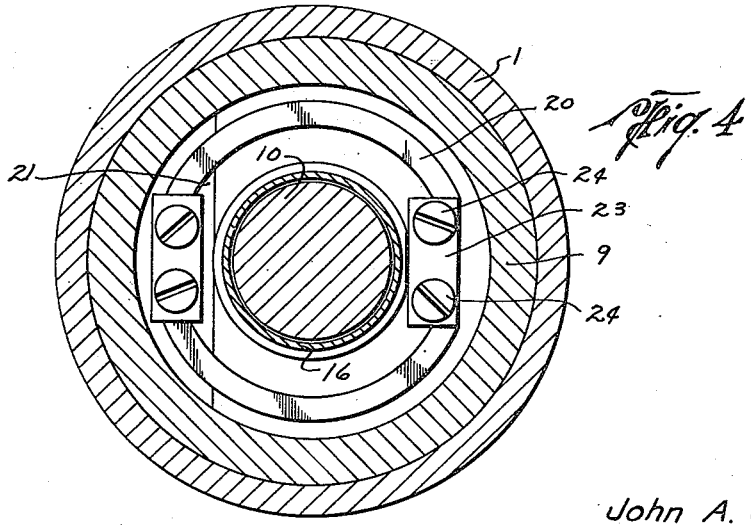

Patented Sept. 8, 1953

2,651,769

UNITED STATES PATENT OFFICE 2,651,769

SEISMIC VIBRATION DETECTOR

John A. Stafford, Tulsa, Okla., assignor to Century Geophysical Corporation, a corporation of Delaware Application August 1, 1952, Serial No. 302,086

3 Claims. (Cl. 340—17)

This invention relates to seismic vibration detectors and particularly to an improved construction of such a detector which, while highly sensitive to seismic vibrations, is insensitive to external alternating magnetic fields.

The trend in modern seismographic prospecting is toward so called "pattern shooting" wherein large numbers of vibration detectors are set out in appropriate spacing patterns over an area to be prospected. As many as 2000 such detectors may be set out at one time in such a pattern. Size and weight of the individual detectors, therefore, become a matter of importance for storage and transportation purposes. Moreover, since such detectors are often dropped from a moving vehicle in setting them out in the desired pattern, ruggedness and compactness likewise become important characteristics.

Additionally, it is highly important that the detectors possess a high degree of sensitivity and at the same time must be relatively insensitive to external alternating magnetic fields, such as those emanating from power lines and the like which are often encountered in the areas being prospected.

Accordingly, an important object of this invention is to provide a detector of small, compact and rugged construction.

Another object is to provide such a detector which is highly sensitive to seismic vibration and is relatively insensitive to external alternating magnetic fields.

A more specific object is to provide a detector construction in which the moving coil of the detector unit is shielded by means of a second coil mounted in concentric relation to the moving coil and electrically inter-connected therewith to obviate the effect thereon of external alternating magnetic fields.

Other and more specific objects of this invention will become more readily apparent from the following detailed description when read in conjunction with the accompanying drawings which illustrate one useful embodiment of a seismic detector in accordance with this invention.

In the drawings:

Fig. 3 is a cross-sectional view looking upward along line 3—3 of Fig. 1; and

Fig. 4 is a cross-sectional view looking upwardly along line 4—4 of Fig. 1.

Figure 1:
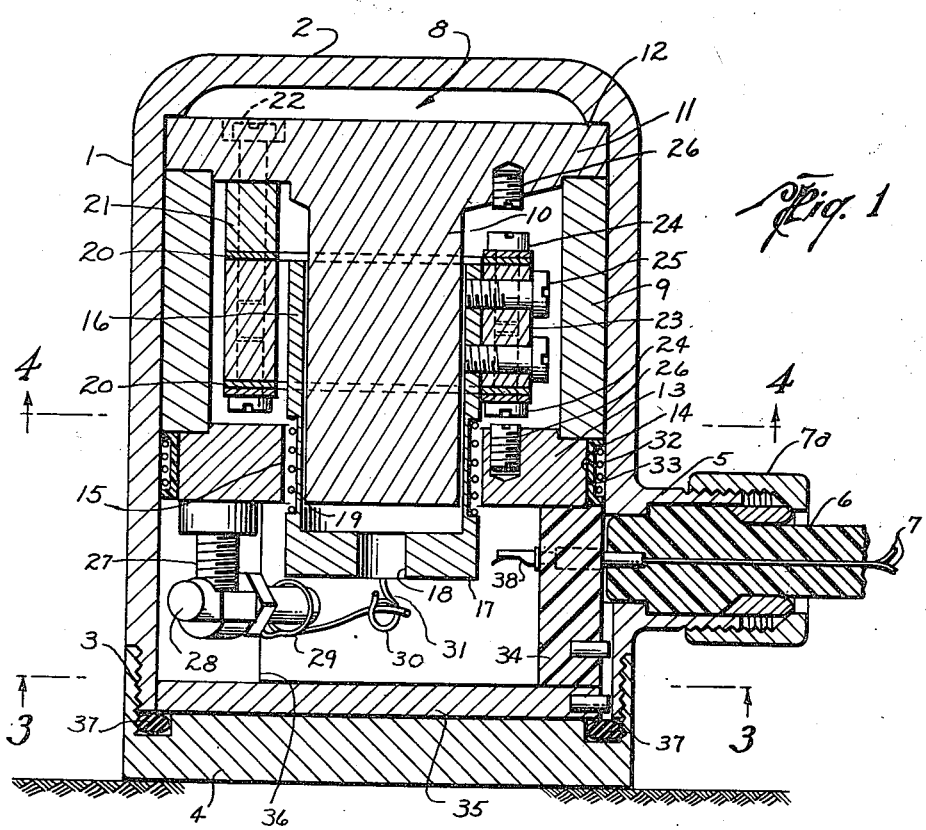
Fig. 1 is a longitudinal cross-section of a detector in accordance with this invention.

Referring to the drawing, the detector device comprises an outer casing 1 of generally tubular form closed at its upper end by an end wall 2, which is preferably, but not necessarily integrally formed with the casing. The lower end of casing 1 is provided with external threads 3 adapted to receive a threaded cap 4 forming a removable closure for the lower end of the casing. A tubular receptacle 5 communicates with the interior of casing 1 adjacent its lower end, and is adapted to receive the end of an insulated cable plug 6 through which electrical conductors 7 extend to the interior of the casing. Plug 6 is secured in receptacle 5 by means of a generally conventional threaded clamping nut 7a.

A detector element, designated generally by the numeral 8, is enclosed within casing 1 and includes a tubular magnet 9 having an outside diameter so as to be slidably insertable in casing 1 with a snug fit. A cylindrical inner pole piece 10, constructed of soft iron, extends downwardly through the center of magnet 9. The upper end of pole-piece 10 is provided with an integral annular flange 11 which rests on the upper end of magnet 9 and is adapted to seat upwardly against a downwardly facing internal annular shoulder 12 formed adjacent the upper end of casing 1. An outer pole-piece 13, composed of soft iron, is annular in shape and seated against the lower end of magnet 9. The outer periphery of pole-piece 13 is made somewhat smaller in diameter than magnet 9 to thereby form an annular recess 14 between the outer periphery of pole-piece 13 and the inner wall of casing 1. The bore of pole-piece 13 is made somewhat larger in diameter than inner pole-piece 10 and is thereby concentrically spaced from the lower end portion of inner pole-piece 10 by an annular space 15 which constitutes the air gap of the magnetic structure.

Concentrically surrounding inner pole-piece 10 and mounted for longitudinal movement relative thereto through air gap 15 is a tubular sleeve 16. The lower end of sleeve 16 extends below the lower ends of the inner and outer pole pieces and is closed by an end wall 17 having an axial opening 18 therein. The portion of the exterior of sleeve 16 which extends through the air gap has wound thereon an induction coil 19 constituting the detector coil of the device. It will be understood that longitudinal movement of coil 19 in the air gap relative to pole pieces 10 and 13 will cut the magnetic flux flowing across the air gap between the pole pieces and thereby generate electric currents and voltages in coil 19 in response to ground motions applied to the detector casing.

Sleeve 16 is resiliently supported on a pair of parallel, longitudinally spaced, flat, generally circular spring metal levers 20—20 which encircle the portion of sleeve 16 extending between the inner end of outer pole-piece 13 and the lower face of flange 11. At one side levers 20—20 are connected to a post 21, the upper end of which is rigidly secured to the lower face of flange 11 by means of a cap screw 22 which extends downwardly through flange 11 into the upper end of post 21. At the other side, levers 20—20 are held in fixed spaced apart relation by means of a spacer block 23, to the opposite ends of which the levers are secured by means of cap screws 24—24. The inner face of spacer block 23 is fixedly secured to the outer wall of cylinder 16 by means of screws 25—25. With this arrangement it will be seen that sleeve 16, carrying coil 19 is resiliently supported about inner pole-piece 10 for longitudinal movement relative thereto but cannot rotate about the pole-piece. Threadedly adjustable bumpers 26—26 are mounted in the upper end of the outer pole-piece and in the lower face of flange 11 in registry with the opposing cap screws 24—24 to thereby provide adjustable stops for limiting the longitudinal oscillation of sleeve 16. Additional damping of the movements of sleeve 16 and coil 19 is effected by providing a post 27 which is secured to the lower face of outer pole-piece 13 and extends downwardly therefrom. An arm 28 is mounted on the lower end of post 27 and extends laterally therefrom below the lower end of end wall 17 of sleeve 16. A coil spring 29 is wrapped about arm 28 and has one end secured thereto. The other end of coil spring 29 extends through a loop 30 formed at the center of a wire bail 31 which is secured to the lower face of end wall 17. With this arrangement it will be seen that sleeve 16 will also be resiliently supported on end of coil spring 29.

A wire coil 32 is wound upon an insulating core 33 which is shaped to fit snugly about the outer periphery of outer pole-piece 13 and within recess 14 and when suitably electrically connected to detector coil 19, as will be subsequently described, forms the shielding coil for neutralizing the currents and voltages induced in detector coil 19 by external alternating magnetic fields in a manner well understood in this art.

The detector element is secured in suitably spaced relation relative to cap 4 by means of a generally tubular spacer sleeve 34, constructed of insulating material, which is inserted in the lower end of casing 1 and extends between the lower end of outer pole-piece 13 and a flat spacer plate 35 which rests on the inner face of cap 4. A portion of spacer sleeve 34 is cut away at 36 (Fig. 3) to accommodate post 27 and arm 28. A packing ring 37 is mounted in an annular groove 38 in the upper face of cap 4 registering with the lower end of casing 1 and forms a fluid-tight seal between the cap and the casing. A pair of connector jacks 38—38 are mounted in the wall of spacer sleeve 34 and provide means for connecting the coil leads to conductors 7.

Figure 2:
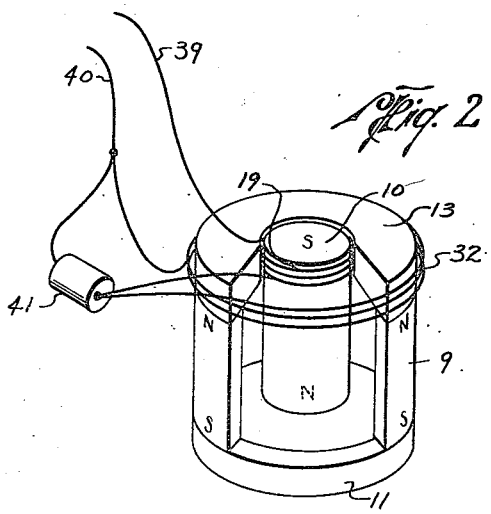
Fig. 2 is a generally schematic view illustrating the electro-magnetic elements of the detector unit and the electrical connections between the detector and shielding coils.

The electrical connections, including a condenser 41, between the movable detector coil 19 and the fixed shielding coil 32 are shown schematically in Fig. 2. As will be evident to those skilled in the art, the electrical inter-connections between these coils, as shown in Fig. 2, are such that the E. M. F.'s generated in the respective coils by external alternating magnetic fields will effectively cancel each other so that the currents and voltages transmitted through the main leads 39—40 to the usual amplifying and recording apparatus (not shown) will be those generated in detector coil 19 in response to relative movement between this coil and the magnetic frames supported in casing 1 resulting from earth vibrations acting on casing 1.

The operation of the detector device is well understood by those skilled in this art. Generally stated, sleeve 16 and coil 19 constitute a resiliently suspended mass, the inertia of which will cause the mass to tend to remain stationary when the casing and the magnetic structure mounted therein are subjected to vibrations of the earth on which the device is positioned. The resulting movement of the magnetic structure relative to coil 19 will induce currents and voltages in the coil which will be transmitted to the amplifying and recording apparatus. At the same time, voltages and currents will be induced in coils 19 and 32 by external alternating magnetic fields but by making coil 32 of appropriate size these externally induced currents and voltages may be made equal in magnitude so that they will cancel each other when the coils are appropriately interconnected, as previously noted, thereby rendering the detector device substantially insensitive to such external fields.

By means of the specific structural form above described, a seismic detector is provided which is compact, small in size and exceptionally rugged in its ability to withstand the usual shocks and rough treatment to which such devices are normally subjected in use. In addition it is highly sensitive and effectively shielded from the influence of external alternating magnetic fields commonly present in areas where such seismic detectors are employed.

It will be understood that various changes and alterations may be made in the structural details of the device herein described within the scope of the appended claims but without departing from the spirit of this invention.

What I claim and desire to secure by Letters Patent is:

1. A seismic vibration detector, comprising, a tubular casing closed at its upper end and having a removable closure for its lower end, a tubular magnet coaxially mounted in the casing, a cylindrical inner pole-piece extending axially through the bore of said magnet, an annular flange integral with the upper end of said inner pole-piece extending laterally between the upper end of said magnet and the closed upper end of said casing, an annular outer pole-piece mounted on the lower end of said magnet concentrically about the lower end portion of said inner pole-piece and annularly spaced therefrom, a tubular sleeve surrounding said inner pole-piece and longitudinally movable relative thereto, the lower portion of said sleeve extending through the annular space between said pole-pieces, resilient support means connecting said sleeve to said flange, an induction coil wound about the portion of said sleeve which extends through said annular space, and a second induction coil fixedly mounted about the outer periphery of said outer pole-piece generally concentric with said first induction coil, said coils being electrically interconnected whereby E. M. F.'s generated in the respective coils by external alternating magnetic fields will effectively balance each other.

2. A seismic vibration detector as defined by claim 1 wherein an additional resilient means is mounted between the lower end of said sleeve and said outer pole-piece.

3. A seismic vibration detector as defined by claim 1 wherein said resilient support means comprises a pair of longitudinally spaced generally circular spring levers surrounding said sleeve, said levers being fixedly secured at one side to said sleeve and at the other side to said flange.

JOHN A. STAFFORD.

References Cited in the file of this patent

UNITED STATES PATENTS

| Number | Name | Date |
|---|---|---|
| 2,456,401 | Gilmore | Dec. 14, 1948 |